Nov. 30, 1943.　　　　F. WALTER　　　　2,335,326
PROJECTOR DEVICE
Filed Nov. 28, 1940　　5 Sheets-Sheet 1
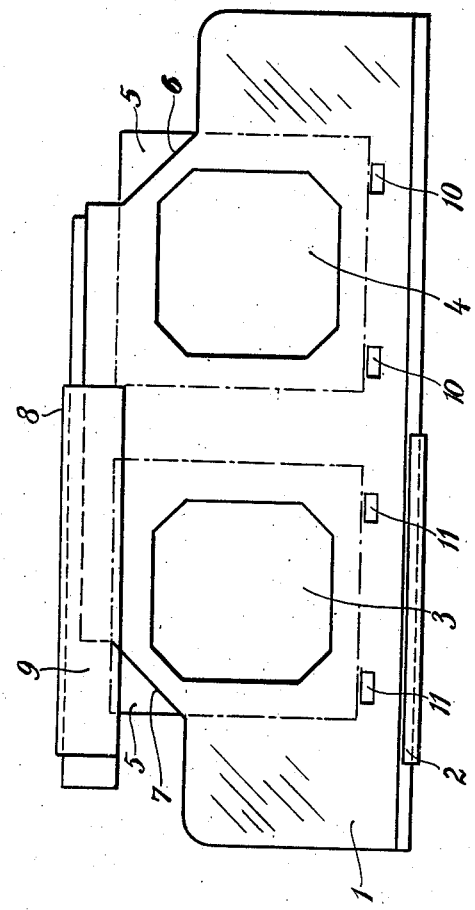
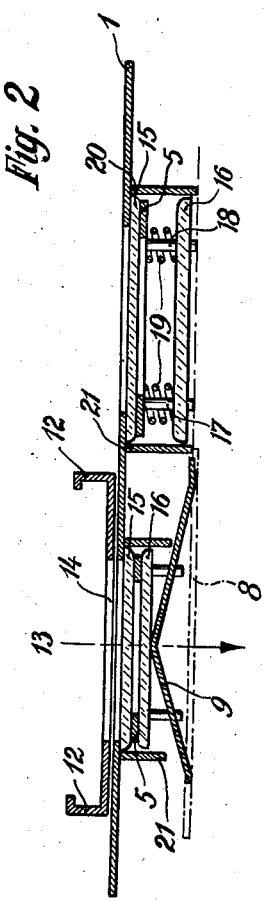
Inventor:

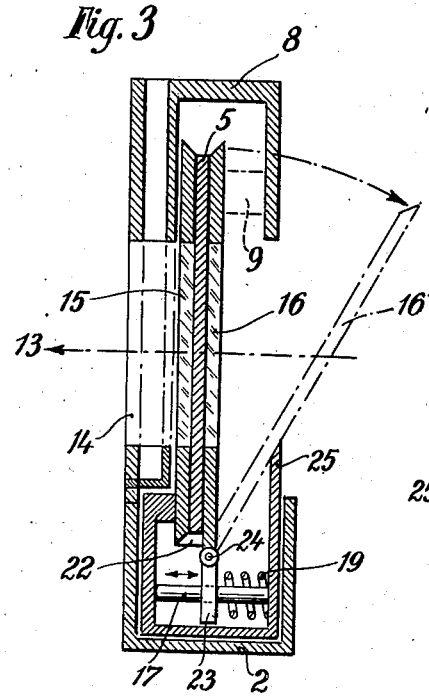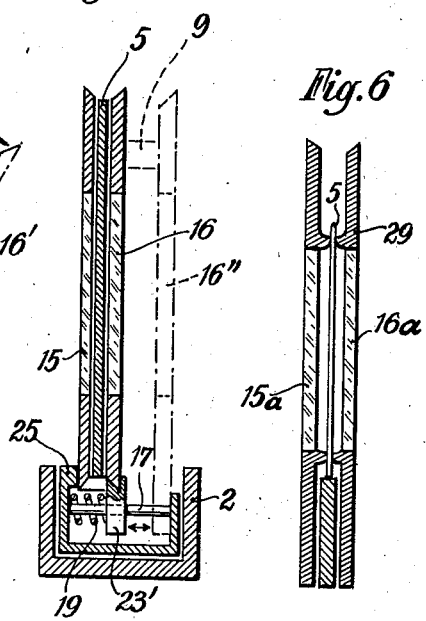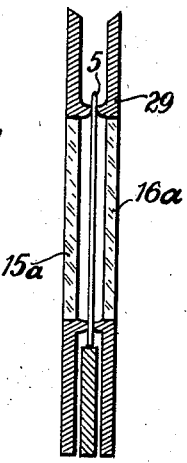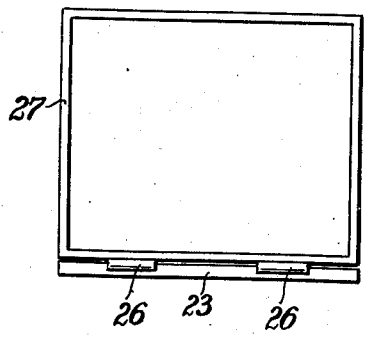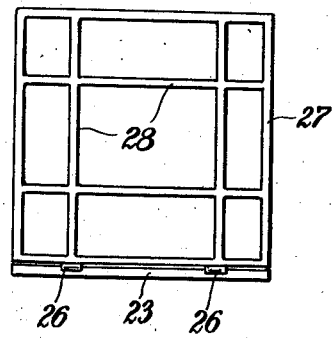

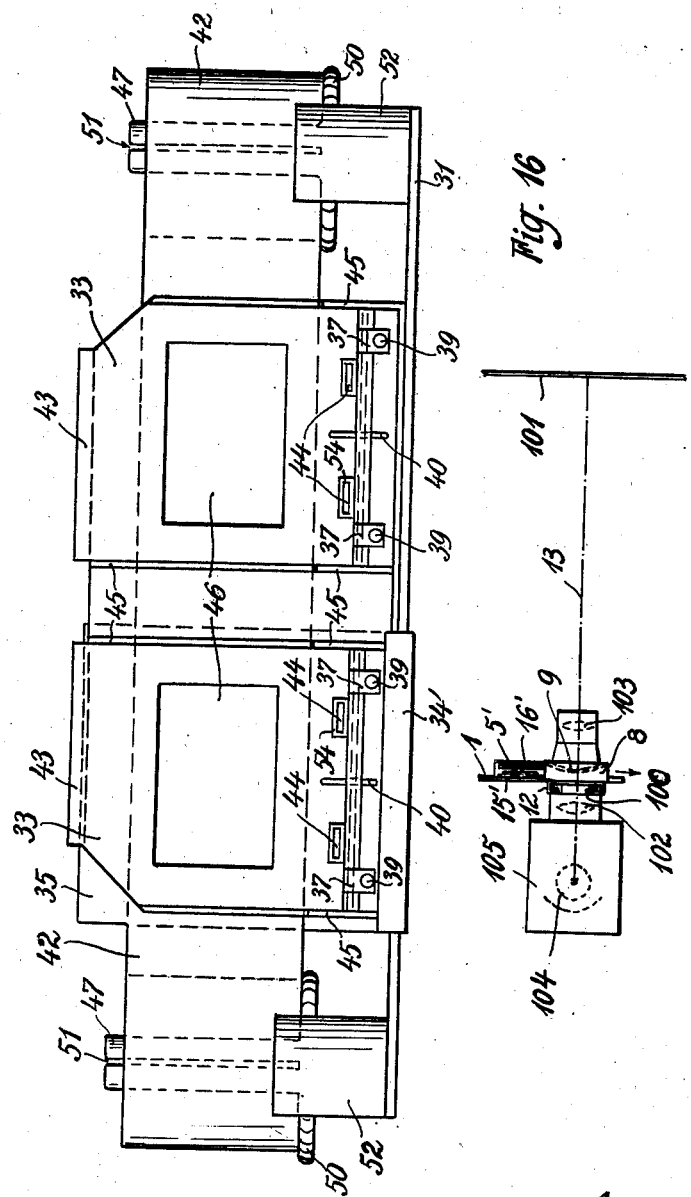

Nov. 30, 1943.  F. WALTER  2,335,326
PROJECTOR DEVICE
Filed Nov. 28, 1940  5 Sheets-Sheet 4
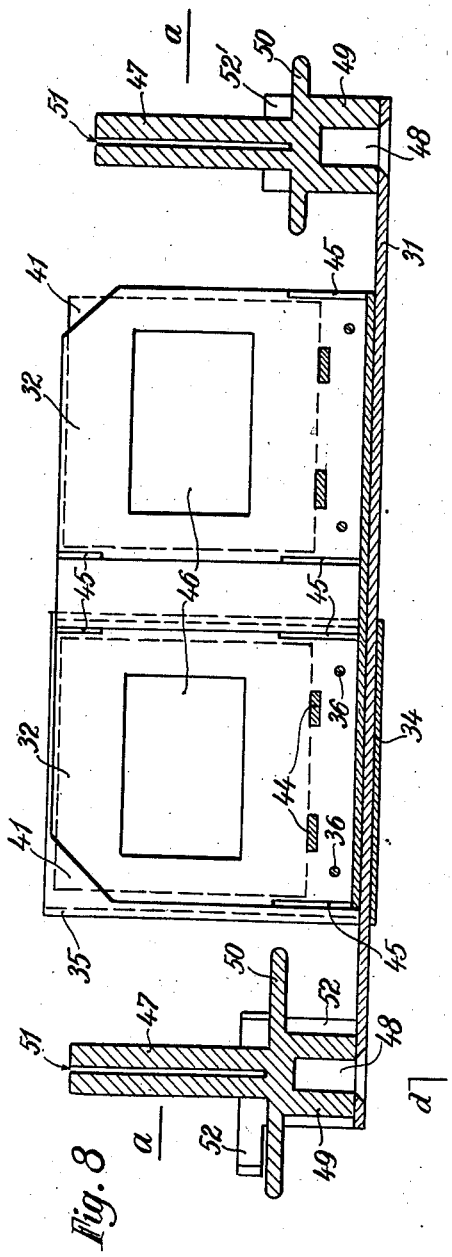
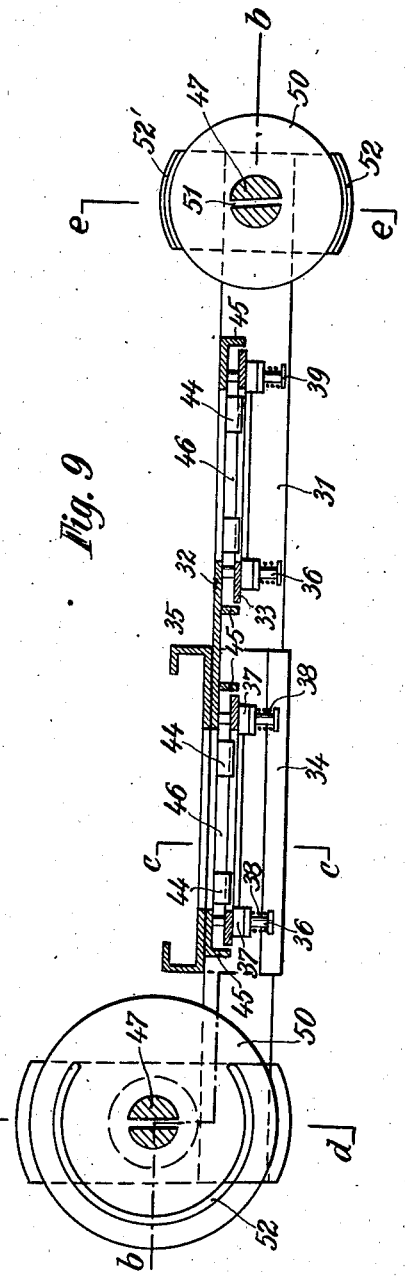
Inventor:

Nov. 30, 1943.   F. WALTER   2,335,326
PROJECTOR DEVICE
Filed Nov. 28, 1940   5 Sheets-Sheet 5
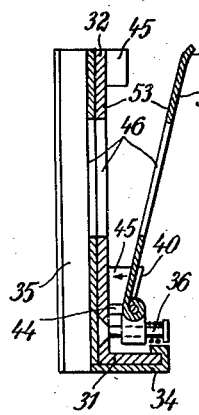
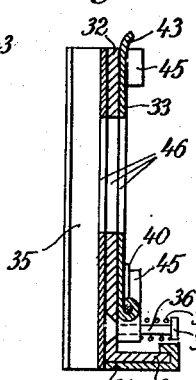
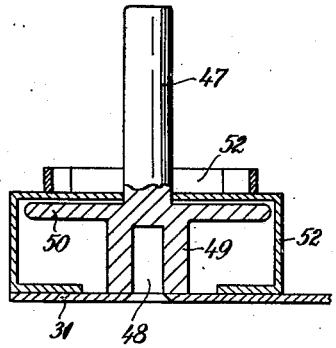
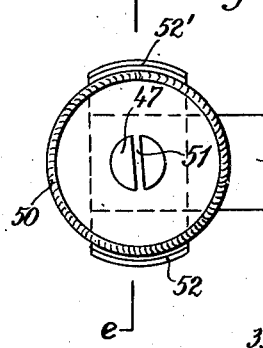
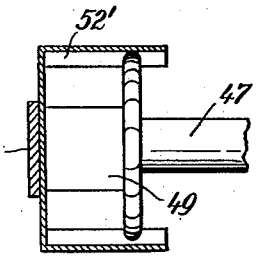
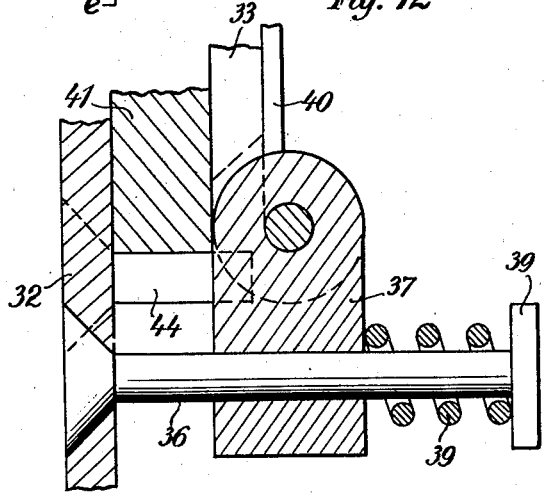
Inventor: F. Fritz Walter Patented Nov. 30, 1943

2,335,326

UNITED STATES PATENT OFFICE 2,335,326

PROJECTOR DEVICE

Fritz Walter, Berlin, Germany; vested in the Alien Property Custodian

Application November 28, 1940, Serial No. 367,501
In Germany September 11, 1939

17 Claims. (Cl. 88—24)

This invention relates to a holder or image slide for transparent image plates, sheets or strips to be passed through a projector for the purpose of projecting transparent, stationary images upon a screen.

It is an important object of the present invention to provide a holder or image slide which can be loaded with transparent image plates, sheets or films of variable thickness, which are not fitted with individual frames.

Another object of the invention is to provide a universal image slide of the type referred to which permits the projection of images from glass plates, image sheets and film strips by a combined device, without any exchange of parts.

With these and further objects in view, as may become apparent from the within disclosures, the invention consists not only in the structures herein pointed out and illustrated by the drawings, but includes further structures coming within the scope of what hereinafter may be claimed.

The character of the invention, however, may be best understood by reference to certain of its structural forms, as illustrated by the accompanying drawings in which—

Fig. 1 is a plan view of an image slide having the invention applied thereto.

Fig. 2 is a longitudinal section of the same slide.

Fig. 3 is a section of a modification having a pressure plate adapted to be swung off.

Fig. 4 is a section of a modification having a pressure plate adapted to be removed from the image by parallel sliding action.

Fig. 5 is an elevation of an image holder including holding members in the form of a frame.

Fig. 5a is an elevation of an image holder including holding members in the form of a grid.

Fig. 6 is a sectional view of a holder plate including glass plates and spacer ribs.

Fig. 7 is a front elevation of a further modification of an image slide.

Fig. 8 is a section on line b—b of Fig. 9, showing a further form of an image slide.

Fig. 9 is a section on line a—a of Fig. 8.

Fig. 10 is a section on line c—c of Fig. 9, showing the image slide in its open condition.

Fig. 11 is a sectional view similar to Fig. 10, but showing the image slide in its closed condition.

Fig. 12 is an enlarged section through the bearing means for the swingable pressure plate.

Fig. 13 is a section on line d—d of Fig. 9.

Fig. 14 is a section on line e—e of Fig. 9.

Fig. 15 is a plan view on Fig. 14.

Fig. 16 is a schematic view of a complete projector arrangement having my novel image slide device attached to it.

Similar characters of reference denote similar parts in the different views.

Referring now to the drawings in greater detail, and first to Fig. 1, it will be noted that the image slide 1 is provided to slide between slide rails 2 and 8 and formed with apertures 3 and 4 for free passage of the pencil of rays 13 emerging from the projection lamp (not shown). The image slide is constructed as a double-acting slide, whose apertures 3 and 4 are alternately moved into the image gate of the projector and exposed to the pencil of light 13. As will be described in detail with reference to Fig. 16, the aperture which in a given moment is not exposed to the light 13, and the appertaining portion of the image slide 1 are freely protruding from the image gate of the projector, for ready introduction of a new image plate or transparent positive 5. Only the stationary parts of the image slide 1 are shown in Fig. 1 while the hinged or swingable parts are illustrated in Figs. 2 to 5a. In order to facilitate the operation of placing an image 5 into the image slide 1, the latter is formed with bevelled faces 6 and 7 on both sides. Provided in the upper guide rail 8 is a flat spring 9 which serves to depress the image 5 as the slide 1 is moved into the position for projecting. Sheet metal tongues (not shown) may project into the interior of the image slide, through the perforations 10 and 11 provided in a stamping or punching operation, for supporting the image plate 5 (Figs. 3 and 4). The image slide may be secured to the projector by means of a U-shaped holder member 12 which in the area covered by the projecting pencil of light 13 is formed with an aperture 14.

Referring now to Fig. 2, it will be noted that as the slide 1 enters the projection window 14, the pressure plate 16 by the leaf spring 9 is resiliently pressed towards the counter-plate 15. The pressure plates 16 may be mounted on guide pins 17 and 18 and are spread apart by means of a pressure or tension spring 19 as the respective portion of the slide 1 comes outside the projection window, thus being ready for exchange or reception of its image plate 5. As the respective portion of the slide 1 is introduced into the projection window, the pressure plate 16 is pressed against the plate 15 by the lower leaf spring 9, so that the image plate is held in a position perpendicularly to the optical axis 13. Lateral holder sheets 20 and 21 serve to prevent lateral displacement of the image plate and define its correct position in the projection window.

Referring now to Fig. 3, the image carrier 25 with the image plate 5 is movable in the lower guide rail 2. The plate 16 in this embodiment may be swung out about a hinge 24 into the position 16' if the holder plates 15 and 16 for the image plate 5 are removed from the projection window 14 and from the reach of the pressure spring 9. The hinge 24 is secured to a support 23 which is movable on pins 17 and exposed to the action of one or more pressure springs 19 tending to swing off the plate 16. The image plate 5 is supported on a lower limiting member 22 extending through plate 16. In the position of plate 16 shown in dotted lines at 16' the slide is drawn out of its guide rails 2 and 8 to such an extent that the plate 16 disengages the upper guide member 9. Normally, however, the plate 16 in its drawn out position still engages the guide member 9 so that it cannot swing out as far as indicated in Fig. 3.

In the embodiment shown in Fig. 4, the image slide 1 by means of a fixed connection between the plates 16 and their supports 23' is so fashioned that the plate 16 when removed from the projection window 14 is parallelly withdrawn into the position 16''. Accordingly the pressure springs 19 in this case are positioned on the opposite side of the supports 23', or tension springs may be used.

In the embodiment shown in Fig. 5, sheet metal frames 27 swingably mounted on supports 23 by means of hinges 26 are used for holding the image sheets. In order to enhance the mechanical strength of the frames, additional ribs 28 may be provided therein to form a kind of grid, as indicated in Fig. 5a. With the aid of this arrangement, the title and other notes on the image plate may be read after loading, although metal frames are used in place of transparent holder plates.

Fig. 6 illustrates the provision of projecting ribs or spacer studs 29 for avoiding the formation of the so-called chromatic rings of Newton in case that glass plates 15a, 16a are provided in the image frame and plane film 5 is to be loaded.

In the embodiment shown in Figs. 7 and 9, two pairs of pressure plates 32, 33 are supported on a bar 31 in a manner similar to Figs. 1 and 2. One pair of plates 32, 33 in the position for projection of the image is disposed in the optical axis of the projector. The bar 31, which may be a bent over portion or flange of the stationary pressure plates 32, is guided in a bearing surface 34 having means 35 for attachment to the projector. The lower part of the stationary pressure plate 32 is provided with two pins 36, a bearing bracket 37 being slidably mounted on each of said pins under action of a spring 38 which leans against end flanges 39 of the pins 36. Under action of the spring 38 the bearing bracket 37 serving as a hinge for the swingable plate 33 leans against the stationary pressure plate 32, while the plate 33 in turn under action of a spring 40 is forced into a vertical position. The springs 38 and 40 thus act in such a manner that the hinged pressure plate 33 always tends to engage flatly on its stationary counter plate 32 or on the image plate, or thin flexible image sheet 41, or image strip 42, respectively, which is placed between the plates 32 and 33 (Fig. 12). In order to place a transparent positive 41 or an image strip 42 into the slide, the movable pressure plate 33 is withdrawn by hand, against action of the spring 40. To this end, the plate 33 at its top edge is formed with a bent extension 43. Limiting pins or plates 44 are secured in the stationary plate 32 for spacing the transparent positive 41 at the bottom. Lateral members 45 serve for defining the position of the transparent positive at its sides. The stationary plate 32 and the movable plate 33 as well as the holder plate 35 are formed with coinciding apertures 46, the size of which corresponds to the image on the transparent positive 41 or the image strip 42.

The bar 31 is formed with extensions on the left and on the right for reception of mandrels 47 which on the one hand serve for winding up the image strip 42 and on the other hand as operating handles for the image slide. These mandrels may be constructed in various manners. Generally it is desirable to mount these mandrels 47 for rotation as on trunnions 48 provided on the ends of the bar 31. The lower portion 49 of the mandrels 47 is made with a larger diameter and a flange 50 is provided between the portions 47 and 49. The height of this flange 50 above the bar 31 is made so that the image strip 42 when applied is moved past the windows 46 in the correct height for ensuring exact coincidence between the single images on the image strip 42 and the windows 46. The flanges 50 are made with a knurled edge so that on rotation of the flanges 50 the image strip is wound up or unwound, the forward end of the image strip being put into a suitable slot 51 of the mandrel 47. Lateral limitations 52 prevent the image strip on the mandrel 47 from falling off from the plate 50.

Two different embodiments of the image strip reel are shown in Figs. 7 to 9. In the embodiment shown on the left hand side of Figs. 8 and 9, and in Fig. 13, the lateral limitations 52 extending beyond the plate 50 are formed so that the image strip reel is guided over a large area all around. In the embodiment of Figs. 7, 8 and 9, right hand side, as well as Figs. 14 and 15, the image strip reel is protected from slipping off at two narrow sides only by the limiting surfaces 52'. The construction is simpler and yet is sufficiently safe.

In order to permit passage of the image strip 42 through the projection window irrespective of the transverse spacers 45, the spacer bars 45 are interrupted in the region of the image strip, as indicated in Figs. 7, 8, 10 and 11.

The abutting faces of the pressure plates 32 and 33 advantageously are provided with a velvet lining 53, so as to ensure a resilient and reliable clamping engagement.

In order that the lower spacer pins or plates 44 can be made of sufficient length for reception of transparent positives 41 of any thickness, suitable holes 54 are provided for these pins in the hinged plate 33, Fig. 7. By way of alternative, the spacer pins 44 may be provided at a relatively low height so as to lie below the movable plate 33, as indicated in Fig. 12.

A complete projector arrangement embodying my novel image slide attachment is shown in Fig. 16. The U-shaped claws of the frame slidably engage a dovetail portion 100 of the projector constituting the image gate thereof. One image plate or member, is clamped between one set of stationary and movable holder plates and is shown aligned with the condenser and objective lenses 102 and 103 and light source 104 of the projector 105 for projection on the screen 101, while the other holder plates, namely 15', 16', outside the pencil of light 13 emerging from the source of light 104 are shown spread apart and freely accessible for removal of the other image plate or member 5' already projected and for reloading with another image plate. After reloading the pair of plates 15', 16' and projection of the image member 5', the image slide 1 may be moved in the direction of the arrow, for projection of the other image 5', and exchange of image member.

I have hereinbefore shown an embodiment of my novel image feeding device which is in the form of a separate attachment to be fitted subsequently to any existing projector. I wish to make it clear, however, that it is also possible to construct a projector including the device as an integral part thereof. In this case, the guide rails 2 and 8 of my image slide may be fixedly secured to the projector, as by screws. On the other hand, in order to fit different types of projectors, the claws 12, Figs. 2 and 16, may be adjustable as to their distance from each other.

It will thus be seen from the foregoing that my novel image slide attachement permits the use of stationary transparent positives of any type. For instance, glass plates, of variable thickness, thin flexible film sheets or film strips may be used in the device without requiring any modification of the same, and positives of any type will be fixedly held in a position exactly at right angles to the optical axis of the projector, while the exchange of the positives is also facilitated.

The method and apparatus of the present invention have been described in detail with reference to specific embodiments. It is to be understood, however, that the invention is not limited by such specific reference but is broader in scope and capable of other embodiments than those specifically described and illustrated in the drawings.

I claim:

1. A device for effecting the exchange of images in a projector for stationary images, comprising a stationary guide secured to the image gate of the projector, a frame member adapted to slide in said stationary guide in a direction transversely to the axis of projection, two image frames in said frame member, each of said image frames comprising a pair of transparent plate members adapted to sandwich an image sheet therebetween, and means for resiliently compressing said plate members of each image frame as it is moved into the image gate for projection.

2. A device for effecting the exchange of images in a projector for stationary images, comprising a stationary guide secured to the image gate of the projector, a frame member adapted to slide in said stationary guide in a direction transversely to the axis of projection, two image frames in said frame member, each of said image frames comprising a pair of transparent plate members adapted to sandwich an image sheet therebetween, and means for resiliently compressing said plate members of each image frame as it is moved into the image gate for projection and means for spreading said plate members apart as their image frame is removed from the image gate.

3. A device for effecting the exchange of images in a projector for stationary images, comprising a stationary guide secured to the image gate of the projector, a frame member adapted to slide in said stationary guide in a direction transversely to the axis of projection, two image frames in said frame member, each of said image frames comprising a pair of transparent plate members adapted to sandwich an image sheet therebetween, and means including flat springs in the stationary guide for resiliently compressing said plate members of each image frame as it is moved into the image gate for projection.

4. A device for effecting the exchange of images in a projector for stationary images, comprising a stationary guide secured to the image gate of the projector, a frame member adapted to slide in said stationary guide in a direction transversely to the axis of projection, two image frames in said frame member, each of said image frames comprising a pair of transparent plate members adapted to sandwich an image sheet therebetween, means for resiliently compressing said plate members of each image frame as it is moved into the image gate for projection and means for spreading said plate members apart as their image frame is removed from the image gate, and stop means for limiting said spreading motion.

5. A device for effecting the feed and exchange of images in projectors for stationary images, comprising a stationary guide secured to the image gate of the projector, a slide member adapted to slide in said stationary guide in a direction transversely to the axis of projection, two image holders in said slide member, each of said image holders comprising a fixed frame member for an image sheet and a spring-acted frame member, said frame members being adapted to sandwich the image sheet therebetween, and means for automatically urging the spring-acted frame member towards its associated fixed frame member as the respective image holder is disposed in the axis of projection.

6. A device for effecting the exchange of images in a projector for stationary images, comprising a stationary guide secured to the image gate of the projector, a frame member adapted to slide in said stationary guide in a direction transversely to the axis of projection, two image frames in said frame member, each of said image frames comprising a pair of transparent plate members adapted to sandwich an image sheet therebetween, spacer means on the inner faces of said transparent plate members for avoiding a face to face engagement between said transparent plates and said image sheet, and means for resiliently compressing said plate members of each image frame as it is moved into the image gate for projection.

7. A device for effecting the exchange of images in a projector for stationary images, comprising a stationary guide adapted to be secured to the image gate of the projector, a frame member adapted to slide in said stationary guide in a direction transversely to the axis of projection, two image frames in said frame member, each of said image frame comprising a pair of transparent plate members adapted to sandwich an image sheet therebetween, means for resiliently compressing said plate members of each image frame as it is moved into the image gate for projection, and mandrels secured to lateral extensions of said frame member, outside said image frames, for unwinding and winding up an image strip to be passed through said image frames.

8. A device for effecting the exchange of images in a projector for stationary images, comprising a stationary guide adapted to be secured to the image gate of the projector, a frame member adapted to slide in said stationary guide in a direction transversely to the axis of projection, two image frames in said frame member, each of said image frames comprising a pair of transparent plate members adapted to sandwich an image sheet therebetween, means for resiliently compressing said plate members of each image frame as it is moved into the image gate for projection, and mandrels secured to lateral extensions of said frame member, outside said image frames, for unwinding and winding up an image strip to be passed through said image frames, said mandrels being detachable.

9. A device for effecting the exchange of images in a projector for stationary images, comprising a stationary guide secured to the image gate of the projector, a frame member adapted to slide in said stationary guide in a direction transversely to the axis of projection, two image frames in said frame member, each of said image frames comprising a pair of transparent plate members velvet-lined at their adjacent faces and adapted to sandwich an image sheet therebetween, and means for resiliently compressing said plate members of each image frame as it is moved into the image gate for projection.

10. A device for effecting the exchange of images in a projector for stationary images, comprising a stationary guide adapted to be secured to the image gate of the projector, a frame member adapted to slide in said stationary guide in a direction transversely to the axis of projection, two image frames in said frame member, each of said image frames comprising a pair of transparent plate members adapted to sandwich an image sheet therebetween, means for resiliently compressing said plate members of each image frame as it is moved into the image gate for projection, and rotary mandrels secured to lateral extensions of said frame member, outside said image frames, for unwinding and winding up an image strip to be passed through said image frames, each of said mandrels including a flange for the film strip which flange is knurled for rotation by hand.

11. A device for effecting the exchange of images in a projector for stationary images, comprising a stationary guide adapted to be secured to the image gate of the projector, a frame member adapted to slide in said stationary guide in a direction transversely to the axis of projection, two image frames in said frame member, each of said image frames comprising a pair of transparent plate members adapted to sandwich an image sheet therebetween, means for resiliently compressing said plate members of each image frame as it is moved into the image gate for projection, mandrels secured to lateral extensions of said frame member, outside said image frames, for unwinding and winding up an image strip to be passed through said image frames, each of said mandrels including a flange for supporting the film strip, and means on said stationary guides for preventing the image strip from falling off from said flange.

12. A device for effecting the exchange of images in a projector for stationary images, comprising a stationary guide secured to the image gate of the projector, a frame member adapted to slide in said stationary guide in a direction transversely to the axis of projection, two image frames in said frame member, each of said image frames comprising a pair of transparent plate members adapted to sandwich an image sheet therebetween, said plate members including inward projections for defining the position of the image sheet therebetween, and means for resiliently compressing said plate members of each image frame as it is moved into the image gate for projection.

13. A device for effecting the exchange of images in a projector for stationary images, comprising a stationary guide adapted to be secured to the image gate of the projector, a frame member adapted to slide in said stationary guide in a direction transversely to the axis of projection, two image frames in said frame member, each of said image frames comprising a pair of transparent plate members adapted to sandwich an image sheet therebetween, said plate members including lateral inward projections for defining the position of image plates therebetween, while not hampering the passage of image strips, means for resiliently compressing said plate members of each image frame as it is moved into the image gate for projection, and mandrels secured to lateral extensions of said frame member, outside said image frames, for unwinding and winding up an image strip to be passed through said image frames.

14. A device for effecting the feed and exchange of images in projectors for stationary images, comprising a stationary guide secured to the image gate of the projector, a slide member adapted to slide in said stationary guide in a direction transversely to the axis of projection, two image holders in said slide member, each of said image holders comprising a fixed frame member for an image sheet and a spring-acted frame member projecting beyond said fixed frame member, said frame members being adapted to sandwich the image sheet therebetween, and means for automatically urging the spring-acted frame member towards its associated fixed frame member as the respective image holder is disposed in the axis of projection.

15. A device for effecting the feed and exchange of images in projectors for stationary images, comprising a stationary guide secured to the image gate of the projector, a slide member adapted to slide in said stationary guide in a direction transversely to the axis of projection, two image holders in said slide member, each of said image holders comprising a fixed frame member for an image sheet and a swingable frame member, said frame members being adapted to sandwich the image sheet therebetween, and means for automatically urging the swingable frame member towards its associated fixed frame member as the respective image holder is disposed in the axis of projection.

16. A device for effecting the feed and exchange of images in projectors for stationary images, comprising a stationary guide secured to the image gate of the projector, a slide member adapted to slide in said stationary guide in a direction transversely to the axis of projection, two image holders in said slide member, each of said image holders comprising a fixed frame member for an image sheet and a spring-acted frame member, said frame members being adapted to sandwich the image sheet therebetween, and means for automatically urging the spring-acted frame member towards its associated fixed frame member as the respective image holder is disposed in the axis of projection and means for withdrawing said spring-acted frame member from its associated fixed frame member as the respective image holder is withdrawn from the axis of projection.

17. In a projector for stationary images, an image gate and a device for effecting the exchange of the image sheets, said device comprising a stationary guide secured to the image gate of the projector, a frame member adapted to slide in said stationary guide in a direction transversely to the axis of projection, two image frames in said frame member, each of said image frames comprising a pair of transparent plate members adapted to sandwich an image sheet therebetween, and means for resiliently compressing said plate members of each image frame as it is moved into the image gate for projection.

FRITZ WALTER.